Feb. 5, 1946.   F. O. EMMITT   2,394,160
HYDRAULIC DRIVE
Filed Feb. 15, 1943   3 Sheets-Sheet 1
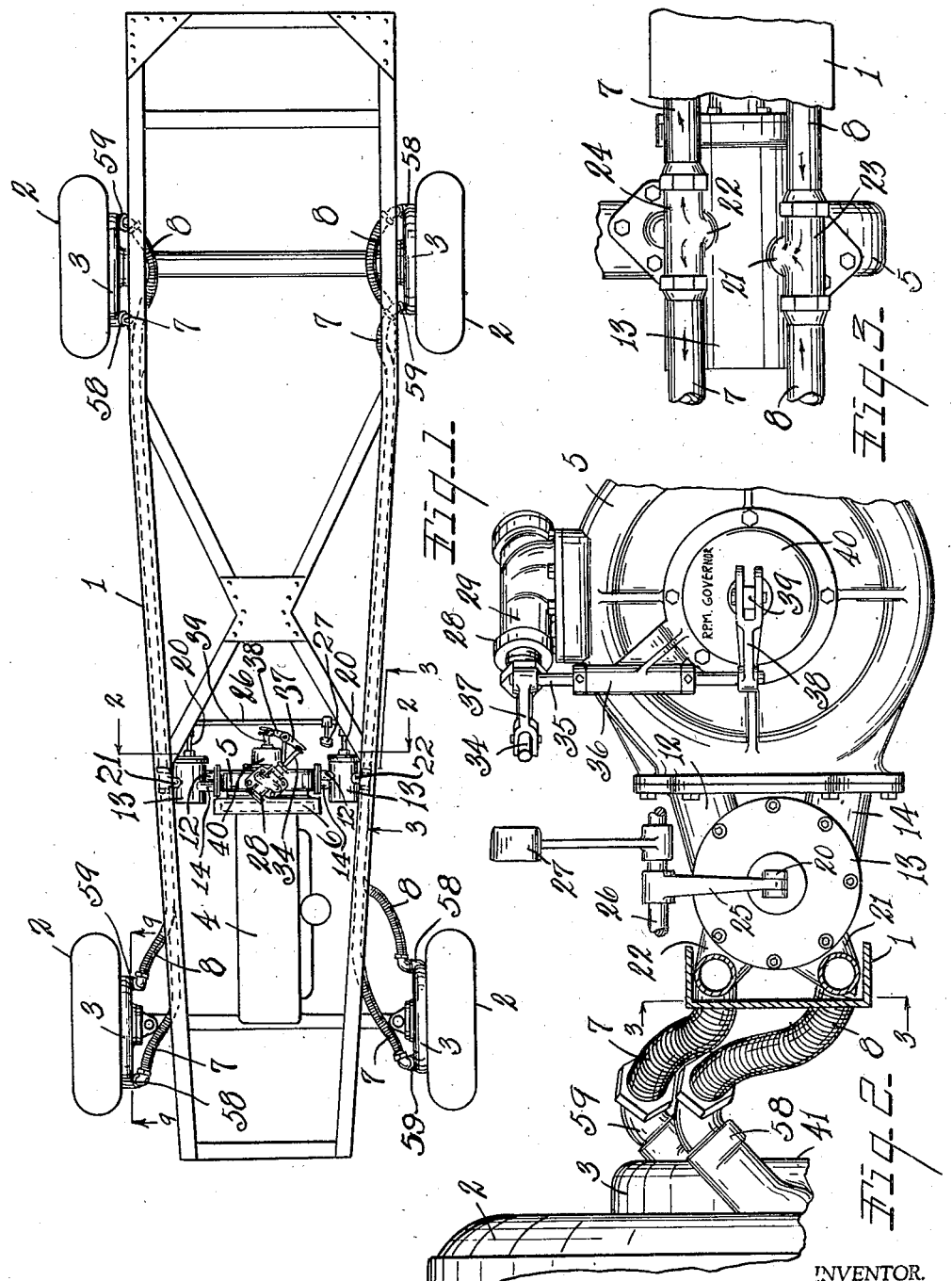
INVENTOR.
Frank O. Emmitt
BY Earl + Chappell
ATTORNEYS.

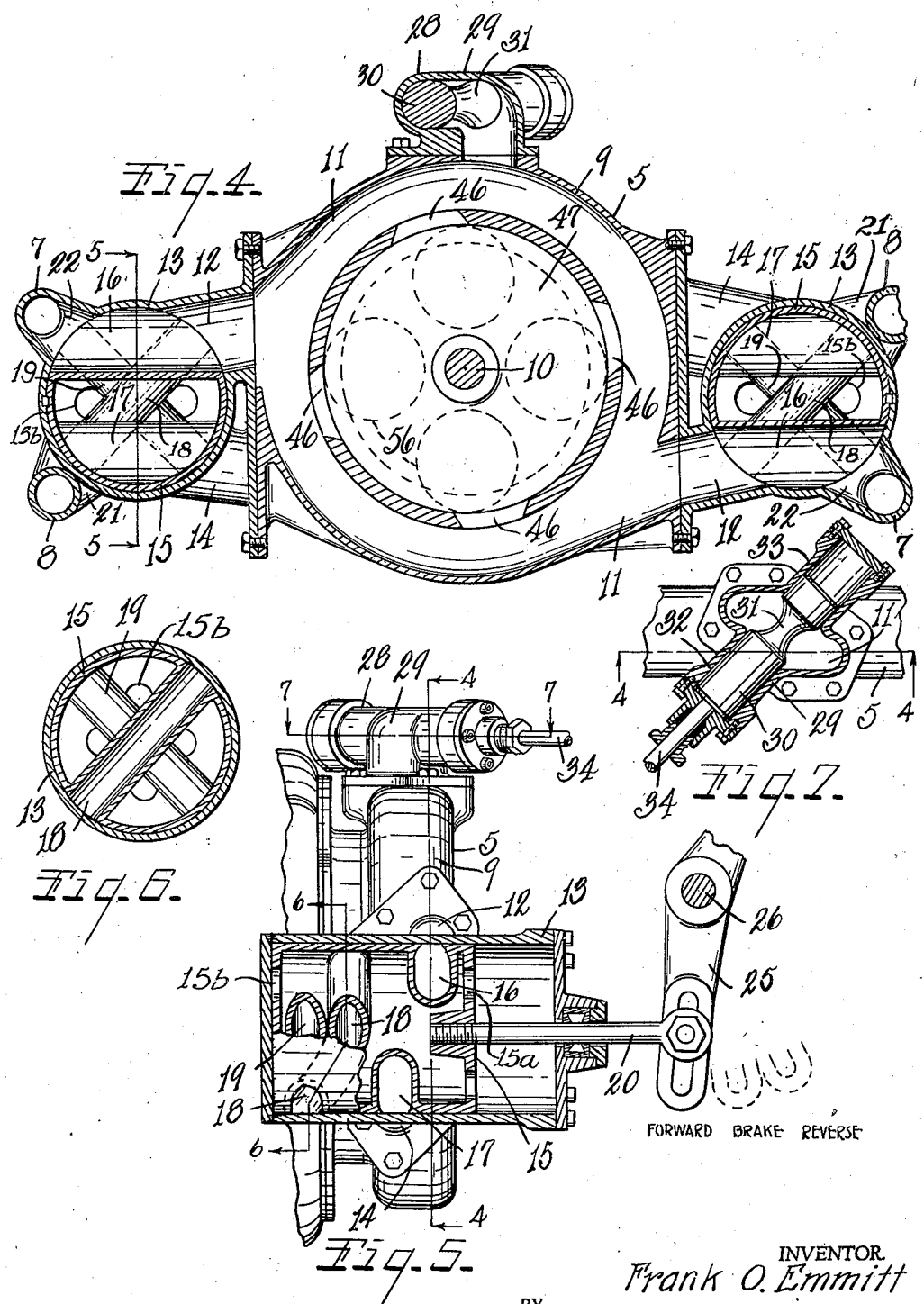

Feb. 5, 1946. F. O. EMMITT 2,394,160
HYDRAULIC DRIVE
Filed Feb. 15, 1943   3 Sheets-Sheet 3
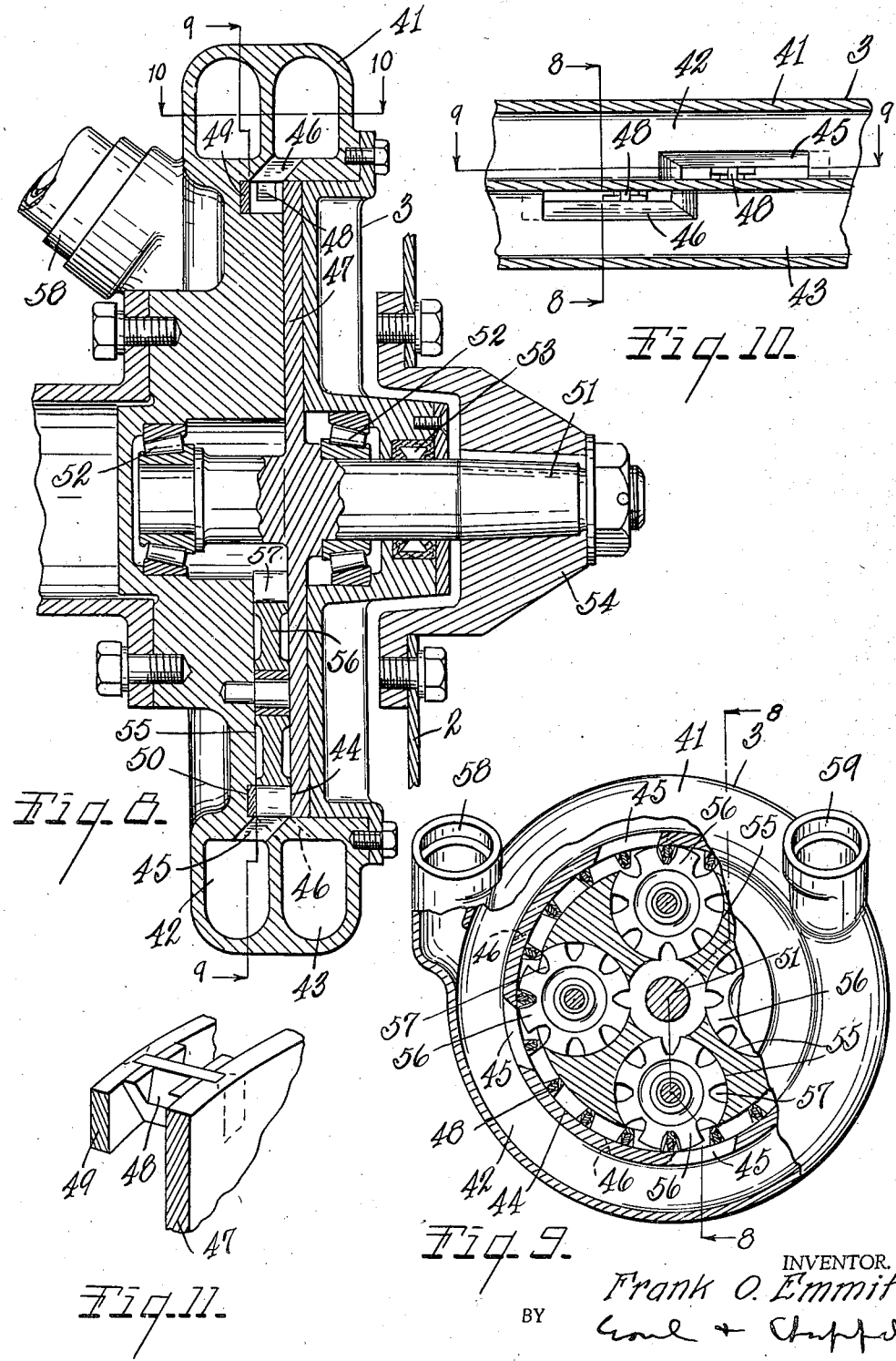
INVENTOR.
Frank O. Emmitt
BY
ATTORNEYS.

Patented Feb. 5, 1946

2,394,160

UNITED STATES PATENT OFFICE 2,394,160

HYDRAULIC DRIVE

Frank O. Emmitt, Detroit, Mich.

Application February 15, 1943, Serial No. 475,937

9 Claims. (Cl. 60—53)

This invention relates to improvements in hydraulic drive.

The main objects of this invention are:

First, to provide a hydraulic drive and transmission for motor cars, trucks, tractors, aeroplanes or any machinery in which power is transmitted from one place to another or in multiple.

Second, to provide a drive of the type described, including an improved fluid motor which is positive, reversible and direct acting and which may be operated on comparatively low pressure.

Third, to provide a fluid motor for a hydraulic drive or transmission of the type described which is characterized by the low vibration, minimum fluid velocity and vacuum created and the effectiveness of application of hydraulic pressure, so as to greatly improve the efficiency of the motor as a unit and of the transmission as a whole.

Fourth, to provide a transmission for vehicles of the type described which is extremely simple in construction and has a minimum of parts requiring attention, repair or replacement.

Fifth, to provide a drive of the type described which is very easily controlled in varying the speed, stopping or braking and reversing.

Further objects relating to details and economies of my invention will appear from the description to follow. The invention is defined in the claims.

A structure embodying the features of my invention is illustrated in the accompanying drawings, wherein:

Fig. 1 is a top plan view illustrating an automobile or like chassis having the hydraulic drive or power transmission of my invention operatively installed thereon.

Fig. 2 is an enlarged fragmentary view in section on a line corresponding to line 2—2 of Fig. 1, illustrating the general relation of the parts of the drive.

Fig. 3 is a fragmentary view in section on a line corresponding to line 3—3 of Figs. 1 and 2, illustrating further details of the structure shown in Fig. 2.

Fig. 4 is a fragmentary view in vertical section on line 4—4 of Figs. 5 and 7 illustrating the construction and arrangement of parts of the pump of the transmission which is driven by the prime-mover of the vehicle, and mechanisms associated therewith for governing the operation thereof.

Fig. 5 is a vertical view in section on line 5—5 of Fig. 4, further illustrating the structure of the control for the transmission.

Fig. 6 is a view in section on line 6—6 of Fig. 5.

Fig. 7 is a fragmentary view in section on line 7—7 of Fig. 5 illustrating the liquid by-passing speed control of the present transmission.

Fig. 8 is a fragmentary view in section on line 8—8 of Figs. 9 and 10 illustrating structural details of one of the wheel driving motors of the present drive.

Fig. 9 is a view partially broken away and in section on line 9—9 of Figs. 1, 8 and 10, further illustrating details of the construction shown in Fig. 8.

Fig. 10 is a view in section on line 10—10 of Fig. 8 illustrating the arrangement of intake and discharge manifolds on the motor and the intake and discharge ports or packages, respectively, leading therefrom to the rotor chamber of the motor.

Fig. 11 is an enlarged fragmentary detailed view illustrating the rotor of the motor.

This invention relates to a hydraulic pump-motor drive for vehicles which is characterized by the low pressure characteristic of its operation, this being in turn made possible by various provisions to be described, whereby the hydraulic pressure is most effectively availed of and vacuum in the motor of the transmission reduced to a minimum. The invention, aside from the various improvements in the control instrumentalities for the transmission as a whole, includes improvements in the manner of applying the actuating liquid to the rotor of the motor so as to take full advantage of the pressure thereof, distributing the liquid to the rotor at a plurality of spaced points circumferentially therearound so as to minimize or eliminate pressure losses as well as frictional losses involved in the circulation of the liquid to and from the rotor, at the same time securing a more uniform distribution of power to the latter in the interest of increased efficiency.

Referring to the drawings, and in particular to Fig. 1, reference numeral 1 designates the chassis of an automotive vehicle such as a pleasure car, truck, or tractor, although it is to be understood that the hydraulic drive of my invention is likewise applicable to any other system wherein it is desired to transmit power from one place to another or in multiple. Each of wheels 2 mounted on the chassis is provided with a hydraulic motor 3 as contemplated by my invention, the said motors constituting a part of the transmission drive to be described. The prime-mover or engine 4 having fly-wheel 6 is supported on the chassis and is connected to the main liquid circulating pump 5 and drives the same.

The reference numerals 7, 8, respectively, designate hydraulic pressure liquid feed and return lines leading from pump 5 to the various motors 3, it being understood that certain control instrumentalities to be described are interposed between these supply and return lines and the pump.

Referring to Figs. 4, 5, 6 and 7, wherein I illustrate the engine driven pump 5 of my transmission and drive, and the control instrumentalities associated therewith, the reference numeral 9 designates a pump housing in the form of a generally circular casting into which the engine propeller shaft 10 extends for the purpose of driving the pump. This pump is in all respects similar in mechanical details to the motor 3 to be hereinafter described, hence the same will not be described in detail at this juncture, save to state that the housing 9 includes suction or intake and discharge or pressure manifolds, the latter of which is designated by the reference numeral 11 in Fig. 4 and communicates through a discharge passage 12 with the cylindrical liquid control valve chambers or housings 13 at either side of pump housing 9. The return pump manifold communicates through return passages 14 with the same valve housings. These return and discharge passages of the respective cylindrical valve passages are disposed in axially spaced relation in the manner illustrated in Fig. 5, and the flow of liquid therethrough to and from the pump housing 9 is controlled by a cylindrical slidable valve 15, which is provided with two sets of transverse through conduits, the conduits of one set being designated 16, 17 and those of the other 18, 19. It will be noted that conduits 16, 17 which are alined with passages 12, 14 respectively for forward operation of the transmission, extend horizontally and parallel to one another through the valve 15; whereas conduits 18, 19, which are communicated with the same passages for reverse operation, are extended diagonally of the valve and cross one another axially, so as to reverse the flow of liquid relative to the pump and motors for reverse driving. The position of the slidable valve 15 is governed by a plunger 20 secured centrally thereto and extending through the end of valve housing 13, as it will be understood.

Valve housing 13 has return and discharge ducts 21, 22, respectively on the opposite side thereof from the return and discharge passages 14, 12, respectively, of the valve housing, these ducts being in the form of branch fittings 24, 23, as illustrated in Fig. 3, communicating centrally with ducts 22, 21, respectively, and at the arms thereof with the hydraulic pressure feed and return connectors or lines 7, 8, respectively. Thus, the liquid discharged through duct 22 branches, as indicated by the arrows of Fig. 3, into the feed lines 7 for the front and rear motors 3 on one side of the chassis, while the liquid returns through the connectors or lines 8 on the same side, enters either end of the fitting 23, and flows into the return duct 21 of the valve housing 13.

From the foregoing it will be appreciated by those skilled in the art that with the valve 15 positioned as illustrated in Fig. 5, the conduit 16 of the valve communicates the pump discharge passage 12 with the motor feed duct 22, hence with pressure lines 7; and conduit 17 is positioned to communicate pump return or intake passage 14 with return duct 21, thereby completing the hydraulic circulation both from the pump to the various motors and from the motors to the pump. It will be understood that there is a similar valve control arrangement on either side of the pump as illustrated in Figs. 1 and 4, and that the plungers 20 controlling the valves thereof are coupled together for simultaneous operation so that the liquid circuit for each of the four wheel motors is identical at all times. Vents 15a and 15b in the front and rear walls, respectively, of the valve member 15 permit the reciprocation of the valve member in the valve housing 13.

The positioning of the parts as illustrated in Fig. 5 corresponds to forward operation of the transmission. Plunger 20 is controlled by levers 25 secured to a rockshaft 26 journaled on a frame, the rockshaft being actuated by a pedal 27 secured thereto and projecting into the operator's compartment of the vehicle, as will be understood. If it is desired to reverse the direction of the motion of the transmission the pedal 27 is fully actuated to rock shaft 26 and the lever 25 to the extreme rearward position of the latter indicated in dotted lines in Fig. 5, bringing valve 15 to its extreme right hand position and causing the angled crossing conduits 18, 19 to communicate valve return duct 21 with discharge passage 12 and valve discharge 22 with return 14. This reverses the flow of liquid to the motors, causing the vehicle to be actuated in reverse. When the valve 15 is actuated to an intermediate position between the forward and reverse positions, as indicated in Fig. 5, communication through valve chamber 13 is cut off either wholly or in part, depending upon the position of the valve, and the vehicle is effectively braked to a greater or less extent and according to whether the transmission is set for forward or reverse operation.

It is evident from the foregoing that the energy delivered to each motor is exactly the same and that a system of the type described eliminates the need for the manually controlled clutch, transmission, universal joints, drive shaft, differential assembly and rear axle assembly.

The speed at which the motors are driven is controlled by a by-passing valve arrangement generally designated by the reference numeral 28 (see Figs. 4, 5 and 7). This includes a cast by-pass casing 29 bolted to the pump housing and provided with passages through which the hydraulic liquid under pressure is adapted to circulate between the feed and return manifolds of the pump. Communication through the by-pass is controlled by cylindrical slide-valve 30 having an annular recess 31 therein, the ends of this plunger valve being guided in cylindrical extensions 32, 33 of the said valve housing 29. It is apparent that as the annular recessed portion of valve 30 is shifted out of full registry with the by-pass opening therein, in which position practically the full pump output is by-passed, back to its intake side and the motors not operated, the amount of liquid which can flow through the by-pass is gradually decreased up to a point where communication through the by-pass valve housing 29 is completely shut off. This corresponds to full speed operation of the pump, there being no liquid by-passed from the pressure to the return manifold of the pump.

Valve 30 is automatically controlled by a plunger 34 secured thereto, which plunger is reciprocated by a speed governor driven from the pump shaft. The arrangement is shown in Figs. 1 and 2, consisting of a shaft 35 appropriately journaled in a bearing 36 on the pump housing and provided with a lateral arm 37 on one end thereof to which plunger 34 is pivoted. Shaft 35 is oscillated at its other end by an arm 38 secured thereto, this last named arm being pivoted to a reciprocatory member 39 which travels axially in either direction, depending upon the speed of rotation of the pump shaft 10. This movement can be effected by means of any well known type of speed governor, not illustrated, as for example, a fly-ball governor disposed internally of a casing 40 on the pump housing.

From the foregoing it is evident that as the speed of engine 4 is increased, the amount of liquid by-passed by the pump from its pressure to its return manifold, hence not effective in actuating motors 3, decreases with resultant increased speed of operation of the motors.

I will now describe the construction and operation of the motor 3 of my invention, it being borne in mind that the pump 5 is of generally similar construction and operates in a similar manner, save, of course, that the impeller thereof is driven by the engine, whereas the motor rotor is liquid driven. Referring to Figs. 8–11, inclusive, the reference numeral 41 designates a cast annular motor housing which is provided with integral annular intake and exhaust manifolds 42, 43 arranged side by side. Radially inwardly of these manifolds, I provide an annular rotor chamber 44 which communicates with manifolds 42, 43, respectively, through the intake and exhaust passages 45, 46, there being four equally spaced intake and four equally spaced exhaust passages arranged circumferentially of the respective manifolds on the inner periphery thereof, in the structure illustrated. Referring to Figs. 8, 9 and 10, it will be noted that the intake passages 45 are disposed somewhat in advance of the exhaust passages in the direction of rotation of the motor rotor, counter-clockwise as viewed in Fig. 9.

Rotatable in the motor housing is a rotor in the form of a circular plate 47, having axially projecting radial vanes or fins 48 spaced around its periphery and an annular ring 49 secured to the vanes on the side thereof opposite the rotor plate, said ring 49 running in an annular recess 50 to one side of and adjoining the rotor chamber 44. The shaft of the rotor is designated by the reference numeral 51 and is journaled by roller bearings 52 in the motor housing, suitable provisions for preventing leakage of the hydraulic fluid, as by a liquid shaft seal or packing 53, being provided. The reference numeral 54 designates the hub of the wheel 2 which is suitably secured to the rotor shaft 51 for rotation therewith.

Referring to Fig. 9, it will be noted that I provide, in the body of the motor housing 41, a plurality of internal circular recesses 55, each intersecting the internal circumference of the rotor chamber 44 and theoretically tangent to the outer periphery or side of the said rotor chamber. Each recess 55 has mounted therein a rotatable fluid discharge wheel or member 56, the periphery of which is notched at 57 so as to receive and fit between the rotor vanes 48 as the rotor is actuated. It will be noted that these fluid discharge members are located adjacent the rear edge of the various intake passages 45 connecting the rotor chamber with the intake manifold, and adjacent the forward edge of the exhaust passages 46, in both cases with reference to the direction of rotation of the rotor. The fluid discharge members 56 serve the purpose of expelling the hydraulic liquid actuating the rotor from between the vanes of the rotor as the same come into registry with the exhaust passages 46, enabling full volume of liquid to enter between the vanes at the intake passages 45 so as to apply full hydraulic pressure to the vanes. The intake and exhaust manifolds 42, 43 are connected adjacent their peripheries to the motor feed and return lines 7, 8 by means of intake and discharge connections 58, 59.

From the foregoing it will be evident that I have made provision to divide the liquid capacity of the rotor into four equal parts by the use of the foregoing fluid discharge members. Entering the intake housing 42 through connection 58, the liquid comes into engagement with the fins or vanes of the rotor after the space therebetween has been cleared of liquid by the expelling action of the fluid discharge members. The manifolds are proportioned relative to the feed and return lines so that full pump pressure of the liquid exists as it enters the several quadrants of the rotor chamber 44. The liquid engages the rotor for but a short distance to the next succeeding discharge port or passage 46 at which it is expelled by the idlers in four equal streams into the exhaust manifold 43. It will be noted that the path of travel of the liquid from one manifold to the other is relatively short and that this is simultaneously occurring at four places. This results in a constant and smooth flowing of the liquid. As a result a comparatively low pressure is sufficient to operate the drive of my invention. Using the full output of a 145 H. P. engine, a pressure of 650 lbs. per sq. in. was developed, with a vacuum in the return of 28 in. of mercury, this pressure operating the motors with entirely satisfactory speed and torque.

Owing to the positive character of the operation of my motor, fluid cannot be forced through the same without rotation in either one direction or the other depending upon the position of the reversing valve 15. When in intermediate braking position, the discharge of the motor is closed and the same stalls at once, the hydraulic fluid being incompressible and having no place to go. In order to accomplish this, air is bled from the system prior to operation and care is taken to insure against oil leaks which would result in air reentering the system.

It will be apparent from the foregoing that I have devised an exceedingly simple transmission and drive for vehicles. Frictional losses are almost entirely eliminated and the speed control is effected automatically in accordance with the speed of the engine. When the by-pass valve 30 is in open position, the pump 5 idles, and no energy is delivered to the motors. Using this hydraulic drive more than 2500 parts of the conventional mechanical transmission and drive are eliminated and a four-wheel drive with four-wheel brakes is provided without requiring brake shoes, linings and drums and the adjustments and replacements which the same require. I am aware that there are at present fluid drives on the market; however, they are for the most part in the form of additional structure on the conventional driving arrangement, involving a propeller shaft and rear axle assembly and the like, all of which are subject to getting out of order.

Experience proves that ordinarily two conditions cause hydraulic machinery to fail, i. e., the high pressures required to operate the same and efficiently loss through internal leaks. This also is attributable to high pressure operation. Owing to the very low pressure required to operate my system, it will be seen that the main source of trouble has been eliminated in the present system.

Another advantageous feature of my structure is the simplicity of control thereof. All gears being eliminated there is no gear shift operation and all the operator need control is the engine throttle, control pedal and steering wheel. The four-wheel hydraulic drive of this invention automatically performs the function of a differential. The hydraulic pressure is equal at all points in the system, but the volume of liquid is automatically varied as one wheel rotates faster than the other, leaving an even pressure at all times in all four motors.

Consistent with the present trend in streamlining the rear of the car bodies and widening the front of the car, and the desirability of mounting the motor in the rear end thereof, my hydraulic drive adds to the practicability of such an arrangement through the elimination of the weight of the transmission and differential. It also affords the opportunity for individually sprung front and rear wheels.

An embodiment of the invention which incorporates the principles of the invention in a highly desirable manner have been illustrated and described. It should be understood that the foregoing terminology is used only descriptively rather than in a limiting sense, and with full intention to include equivalents of the features shown and described, within the scope of the following claims.

Having thus described my invention, what I claim as new and desire to secure by Letters Patent is:

1. In a transmission of the type described, a housing including an annular rotor chamber and a plurality of circumferentially spaced circular recesses disposed radially inwardly of and coplanar with said chamber and communicating therewith, said chamber having relatively fixed inner and outer peripheral sides, rotatable toothed fluid discharge members disposed concentrically in said recesses and projecting through the inner peripheral side and running tangential to the outer peripheral side of said chamber, a rotor concentric with and running in the chamber having tooth-like vanes of radial dimension equal to that of the chamber, said vanes meshing with the fluid discharge members and traveling in the chamber as the rotor is rotated, an intake manifold externally concentric with the rotor chamber having a plurality of intake openings to said chamber through the outer peripheral side of said chamber, one for each fluid discharge member, located adjacent the latter, said openings equally dividing the liquid in the intake manifold and applying the same to the vanes of said rotor at a plurality of points circumferentially of the latter, and an exhaust manifold externally concentric with said chamber having a plurality of exhaust passages, one for each fluid discharge member, communicating with the chamber through the outer peripheral side of said chamber, being located adjacent the latter.

2. In a transmission of the type described, a housing including an annular rotor chamber and a plurality of circumferentially spaced circular recesses disposed radially inwardly of and coplanar with said chamber and communicating therewith, said chamber having relatively fixed inner and outer peripheral sides, rotatable toothed fluid discharge members disposed concentrically in said recesses and projecting through the inner peripheral side and running tangential to the outer peripheral side of said chamber, a rotor concentric with and running in the chamber having tooth-like vanes of radial dimension equal to that of the chamber, said vanes meshing with the fluid discharge members and traveling in the chamber as the rotor is rotated, an intake manifold externally concentric with the rotor chamber having a plurality of intake openings to said chamber through the outer peripheral side of said chamber, one for each fluid discharge member, located adjacent and slightly in advance of the respective fluid discharge members in the direction of rotation of the rotor for admission of liquid through said openings to said chamber, said openings equally dividing the liquid in the intake manifold and applying the same to the vanes of said rotor at a plurality of points circumferentially of the latter, and an exhaust manifold externally concentric with said chamber having a plurality of exhaust passages, one for each fluid discharge member, communicating with the chamber through the outer peripheral side of said chamber, being located adjacent but slightly displaced angularly rearwardly of the respective fluid discharge members relative to the direction of rotation of the rotor, whereby the teeth of the fluid discharge members discharge liquid from between said vanes through said discharge passages as the fluid discharge member teeth register angularly with the passage.

3. In a transmission of the type described, a casing defining an annular rotor chamber, said chamber having relatively fixed inner and outer peripheral sides, a rotor concentric with the chamber having vanes of radial dimension equal to that of the chamber traveling in the chamber as the rotor is rotated, an exhaust manifold having a plurality of exhaust passages communicating the same with said chamber through the outer peripheral side thereof and at spaced points circumferentially thereof, and an intake manifold having a plurality of angularly spaced intake openings to said rotor chamber communicating the manifold to the chamber through the outer peripheral side of said chamber, said intake openings being located slightly in advance of the respective exhaust passages in the direction of rotation of the rotor whereby liquid is admitted through said openings to said chamber following discharge of liquid therefrom through said passages, said openings dividing the liquid in the intake manifold and applying the same to the vanes of said rotor at a plurality of points circumferentially of the latter, and rotatable toothed fluid discharge members operatively associated with the vanes of said rotor to discharge the fluid therefrom at said exhaust passages.

4. An apparatus of the class described comprising a casing having means defining an annular rotor chamber with relatively fixed inner and outer peripheral sides, and a plurality of angularly spaced arcuate recesses disposed internally of and intersecting the inner peripheral side of said chamber so as to open to the latter, rotatable toothed fluid discharge members disposed in said recesses with the teeth thereof rotating in approximate internal tangency with the outer peripheral side of said chamber, said teeth and chamber being coextensive in axial dimension, a rotor concentric with said chamber having vanes traveling in the latter extending radially from the inner to the outer peripheral limit of the chamber and drivingly meshing with the teeth of said fluid discharge members to rotate the latter, said casing having means defining annular intake and exhaust manifolds externally concentric with said chamber immediately adjacent the outer periphery thereof, and a plurality of sets of radial intake and exhaust passages, one for each fluid discharge member, respectively communicating the manifolds with the rotor chamber at points adjacent the fluid discharge members, whereby liquid is smoothly supplied to said chamber from the intake manifold and discharged to the exhaust manifold at a plurality of points circumferentially of the chamber, the intake and exhaust passages of each set being located respectively slightly in advance of and rearwardly of the respective fluid discharge members with reference to the direction of the rotation of the rotor.

5. An apparatus of the class described comprising a casing having means defining an annular rotor chamber with relatively fixed inner and outer peripheral sides, and a plurality of angularly spaced arcuate recesses disposed internally of and intersecting the inner peripheral side of said chamber so as to open to the latter, rotatable toothed fluid discharge members disposed in said recesses with the teeth thereof rotating in approximate internal tangency with the outer peripheral side of said chamber, a rotor concentric with said chamber having vanes traveling in the latter and drivingly meshing with the teeth of said fluid discharge members, said casing having means defining annular intake and exhaust manifolds, concentric with said chamber, and a plurality of sets of intake and exhaust passages, one for each fluid discharge member, respectively communicating the manifolds with the rotor chamber at points adjacent the fluid discharge members, whereby liquid is supplied to said chamber from the intake manifold and discharged to the exhaust manifold at a plurality of points circumferentially of the chamber.

6. In an apparatus of the class described, the combination of a casing having an annular chamber with relatively fixed inner and outer peripheral sides, and a plurality of pairs of circular chambers coplanar with said annular chamber, and being tangential to the outer wall of and opening through the inner wall of said annular chamber, a pair of manifolds surrounding said annular chamber, a rotor having a plurality of radially disposed tooth-like vanes projecting from the face thereof and traveling in said annular chamber, a toothed fluid discharge member concentrically mounted for rotation in and substantially filling each of said circular chambers, said fluid discharge member meshing with the vanes of said rotor, a plurality of equally spaced openings from one manifold into said annular chamber disposed adjacent the points of tangency of the outer wall of the annular chamber and the circular chambers, and a plurality of openings from the other manifold to the annular chamber disposed on the opposite sides of said points of tangency from the aforesaid openings from said first manifold, said openings from each manifold being disposed through the outer peripheral wall of said annular chamber.

7. In an apparatus of the class described, the combination of a casing having an annular chamber with relatively fixed inner and outer peripheral sides, and a plurality of circular chambers coplanar with said annular chamber, and being tangential to the outer wall of and opening through the inner wall of said annular chamber, a pair of manifolds surrounding said annular chamber, a rotor having a plurality of radially disposed tooth-like vanes projecting from the face thereof and traveling in said annular chamber, a toothed fluid discharge member concentrically mounted for rotation in and substantially filling each of said circular chambers, said fluid discharge member meshing with the vanes of said rotor, a plurality of equally spaced openings from one manifold into said annular chamber disposed adjacent the points of tangency of the outer wall of the annular chamber and the circular chambers, and a plurality of openings from the other manifold to the annular chamber disposed on the opposite sides of said points of tangency from the aforesaid openings from said first manifold.

8. In combination, a casing having an annular rotor chamber with relatively fixed inner and outer peripheral sides, and a pair of manifolds disposed in side by side relation externally concentric of said chamber and similarly positioned relative thereto, a plurality of angularly spaced arcuate recesses disposed inwardly of and intersecting the inner peripheral side of said rotor chamber to open thereto, a rotor comprising a web portion rotatably disposed at the side of said recesses and having a plurality of vanes disposed on the side thereof to travel within said rotor chamber and extending radially from the inner to the outer peripheral surfaces thereof, toothed fluid discharge members rotatably mounted in said recesses with the teeth thereof rotating in approximate internal tangency to the outer peripheral side of the rotor chamber, the teeth of said fluid discharge members being spaced to receive said vanes between them, said teeth, rotor chamber, and vanes being substantially co-extensive in axial dimension, and a plurality of sets of radial intake and exhaust ports, one set for each of said fluid discharge members respectively communicating the manifolds with the rotor chamber at points adjacent the fluid discharge members, said intake and exhaust ports opening through the outer peripheral side of said chamber.

9. In combination, a casing having an annular rotor chamber with relatively fixed inner and outer peripheral sides, and a pair of manifolds disposed in side by side relation externally concentric of said chamber and similarly positioned relative thereto, a plurality of angularly spaced arcuate recesses disposed inwardly of and intersecting the inner peripheral side of said rotor chamber to open thereto, a rotor comprising a web portion rotatably disposed at the side of said recesses and having a plurality of vanes disposed on the side thereof to travel within said rotor chamber and extending radially from the inner to the outer peripheral surfaces thereof, toothed fluid discharge members rotatably mounted in said recesses with the teeth thereof rotating in approximate internal tangency to the outer peripheral side of the rotor chamber, the teeth of said fluid discharge members being spaced to receive said vanes between them, and a plurality of sets of radial intake and exhaust ports, one set for each of said fluid discharge members respectively communicating the manifolds with the rotor chamber at points adjacent the fluid discharge members.

FRANK O. EMMITT.